June 21, 1932.  E. WANAMAKER  1,863,774
BUSHING FOR ROTARY MEMBERS
Filed Nov. 11, 1929
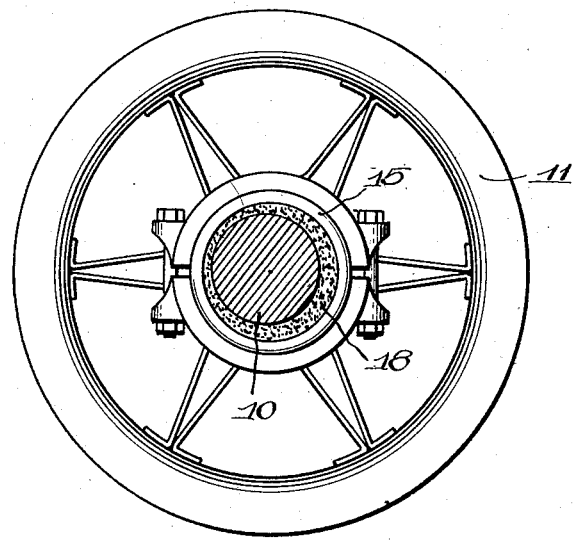
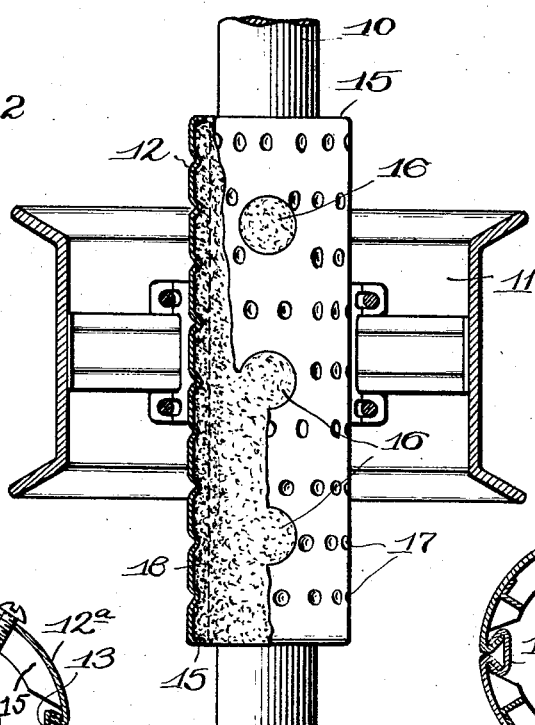
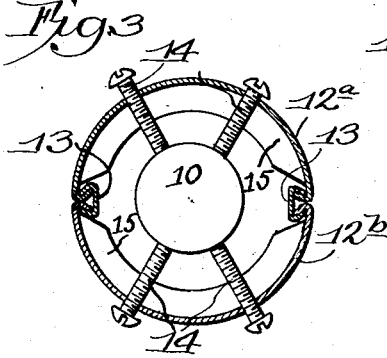
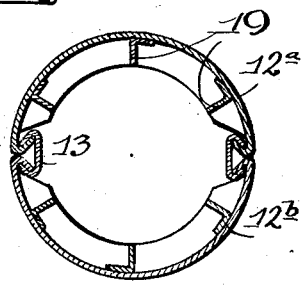
Witness:
Chas. P. Koursh
Inventor,
Ernest Wanamaker,
George Bayard Jones, Atty.

Patented June 21, 1932

1,863,774

UNITED STATES PATENT OFFICE

ERNEST WANAMAKER, OF CHICAGO, ILLINOIS, ASSIGNOR TO U. S. OIL AND SERVICE CORPORATION, OF NEW YORK, N. Y., A CORPORATION OF NEW YORK

BUSHING FOR ROTARY MEMBERS

Application filed November 11, 1929. Serial No. 406,452.

This invention relates to improvements in bushings for rotary members and the method of forming the same.

One object of the invention is to provide an improved bushing adapted to be centered with respect to the true axis of rotation of a shaft, axle or the like for so supporting a pulley or other rotary element that such element will rotate about the true axis of rotation of the shaft or axle irrespective of the eccentricity of the outer surface of the latter. It will be apparent, however, that the present improvements can be employed for mounting a bushing at any desired eccentricity with respect to the axis of rotation, when desired.

Another object of the invention is to provide a bushing having an outer shell which forms a permanent protective casing for the interior of the bushing which is formed of hardenable plastic material, the said shell forming a flask or mold for casting the interior portion directly upon the axle or shaft.

Another object is to provide a shell of complementary parts which can be assembled around a shaft or axle at the place where it is to be mounted, thus obviating the necessity of removing other elements from the shaft or axle, such as wheels or pulleys for instance.

Other objects relate to various features of construction and arrangement of parts which will be apparent from a consideration of the following specification and accompanying drawing, wherein:

Fig. 1 is an end elevation of a pulley mounted on a shaft in which one form of the present improvements is incorporated;

Fig. 2 is a sectional plan view thereof;

Fig. 3 is a transverse sectional view of the bushing shell; and

Fig. 4 is a transverse section of a modified form of the bushing shell.

In the drawing, 10 is a shaft or axle which may in fact be the axle of a railway car upon which a pulley 11 is mounted. The pulley may be any rotatable member which it is desired to mount upon a shaft or axle. The present improvements are especially adapted for mounting the pulleys on railway truck axles which operate the car lighting generators although it will be apparent that the invention is not limited to such particular use.

It is frequently desirable to mount a pulley upon a shaft or axle, the outer surface of which is not exactly concentric with the axis of rotation. In car lighting systems this is particularly objectionable since the eccentricities of the pulley imposes a rapid series of stresses or jerks upon the generator belt which greatly lessens its period of usefulness and not infrequently causes the belt to break and drop off along the railway bed.

In the present improvements a metal shell 12 is employed and preferably is formed in at least two complemental sections 12a and 12b. These sections have their adjacent edges turned inwardly as shown clearly in Fig. 3 and secured together by a locking bar 13 of channel form. The assembled sections form a cylinder which can conveniently be positioned around the shaft or axle, the locking bars 13 being merely slid into locking relation from either end of the shell sections.

Adjusting studs 14 are threaded in the shell by means of which the shell can be adjusted concentrically with the axis of rotation irrespective of any eccentricity of the outer surface of the shaft. Such eccentricity of the outer surface of the axle is illustrated in Fig. 1. The ends of the shell sections preferably have inwardly turned end flanges 15 which assist in confining the hardenable plastic material hereinafter referred to within the shell.

Additional means may be utilized for completely closing the gap between the inner edge of the flanges 15 and the outer surface of the shaft, if desired. After the shell has been assembled on the axle and properly adjusted with reference to the axis of rotation of the shaft or axle by any suitable means such as by the gauging apparatus described in my copending application Serial No. 289,054, filed June 28, 1928, a hardenable plastic material is poured into the shell. This may be poured through one or more openings 16 provided in the shell for that purpose, or it may be inserted by means of any suitable pressure gun, if desired. After the plastic material has set, the adjusting studs 14 may be removed. The composition of the plastic material may be that disclosed in my copending application above mentioned or any other material suitable for the purpose.

The shell sections shown in Figs. 1, 2, 3, are provided with a number of indentations 17 which prevent slipping of the shell with reference to the hardened plastic material 18. In the modified form shown in Fig. 4 a number of lugs 19 are shown secured to the inner surface of the shell for firmly anchoring the same to the material 18. After the material 18 has hardened, the pulley 16, of any suitable construction, is mounted on the bushing and is ready for use. It has been found convenient to form the bushings of such length when employed on car axles that the pulleys may be mounted either in the center of the axle where a center drive generator is employed or offset to one side of the center when the generator is correspondingly positioned. The shell protects the material 18 from injury by flying ballast and from exposure to the weather, and simplifies the formation of the bushing upon the axle, as the shell in addition to forming the outer protecting sheath for the bushing also forms a mold or flask into which the plastic material is poured.

It will be apparent from the above description that should it be desirable to mount the bushing at a given eccentricity with reference to the axis of rotation of the shaft or axle, such result can readily be accomplished by the proper adjustment of the studs 14 and thereafter completing the bushing as described above.

Although I have shown and described a certain modification of my improvements for the purpose of illustration, I do not wish to be restricted specifically thereto except as so limited by the appended claims.

What I claim is:

1. The combination of a rotary shaft, a bushing on said shaft comprising a shell formed of semi-cylindrical sections having inwardly directed members adjacent their longitudinal edges, means for locking said members of one section to complemental members of another section when said sections have been arranged in the form of a cylinder around a shaft, a body of hardenable plastic material interposed between said shaft and shell for supporting the latter and securing the same against rotation relatively to said shaft, and a rotary member detachably secured to said shell.

2. The combination with a rotary shaft, an outer shell for a bushing having an interior body cast in situ therein upon said shaft, said shell comprising a plurality of complemental members adapted to be arranged in cylindrical form around the shaft, and having their longitudinal edges directed inwardly, channel members each adapted for engaging a pair of said edges for securing said sections together, and a pulley removably secured to said shell.

3. The combination of a rotary shaft, a shell arranged around said shaft in pre-determined relation with respect to the axis of rotation thereof and spaced therefrom, said shell comprising a pair of semi-cylindrical sections, means for securing said sections together after the same have been assembled in cylindrical form around said shaft, a body of hardenable plastic material within said shell forming a bond between the same and said shaft, and a rotary member detachably secured to the exterior of said shell for rotation with said shaft.

In testimony whereof, I have subscribed my name.

ERNEST WANAMAKER.